US010861024B2

(12) United States Patent
Singer et al.

(10) Patent No.: US 10,861,024 B2
(45) Date of Patent: Dec. 8, 2020

(54) SYSTEMS, METHODS, AND MEDIA FOR RESTRICTING PLAYBACK FUNCTIONALITY OF A MEDIA DEVICE IN RESPONSE TO DETECTING UNAUTHORIZED CONTENT

(71) Applicants: Howard M. Singer, Morganville, NJ (US); George Lydecker, Studio City, CA (US)

(72) Inventors: Howard M. Singer, Morganville, NJ (US); George Lydecker, Studio City, CA (US)

(73) Assignee: Warner Music Inc., New York, NY (US)

( * ) Notice: Subject to any disclaimer, the term of this patent is extended or adjusted under 35 U.S.C. 154(b) by 275 days.

(21) Appl. No.: 16/034,032

(22) Filed: Jul. 12, 2018

(65) Prior Publication Data

US 2019/0019198 A1  Jan. 17, 2019

Related U.S. Application Data

(63) Continuation of application No. 14/181,329, filed on Feb. 14, 2014, now abandoned.
(Continued)

(51) Int. Cl.
*G06Q 30/00*  (2012.01)
(52) U.S. Cl.
CPC ................... *G06Q 30/018* (2013.01)
(58) Field of Classification Search
CPC .......................... H04N 21/8355; G06Q 30/018
See application file for complete search history.

(56) References Cited

U.S. PATENT DOCUMENTS

| 5,479,168 A | 12/1995 | Johnson et al. |
| 6,868,403 B1 | 3/2005 | Wiser et al. |

(Continued)

FOREIGN PATENT DOCUMENTS

| EP | 2400719 | 12/2011 |
| JP | 2005-524263 | 8/2005 |

(Continued)

OTHER PUBLICATIONS

Extended European Search Report dated Aug. 23, 2016 in European Patent Application No. 14751976.3.
(Continued)

*Primary Examiner* — Aryan E Weinsenfeld
(74) *Attorney, Agent, or Firm* — Byrne Poh LLP

(57) ABSTRACT

Mechanisms for restricting playback functionality of a media device in response to detecting unauthorized content are provided, the mechanisms being configured to: determine whether a piece of media content on a media device is unauthorized content known to be obtained through an authorized channel; and in response to determining that the piece of media content is unauthorized content: cause the media device to present a warning to a user to remove the unauthorized content; and change a setting on the media device by sending instructions to a hardware processor of the media device so that decryption of an authenticity token is inhibited for all media content on the media device, wherein the media content on the media device includes a plurality of pieces of media content.

15 Claims, 10 Drawing Sheets

Related U.S. Application Data

(60) Provisional application No. 61/764,731, filed on Feb. 14, 2013.

(56) References Cited

U.S. PATENT DOCUMENTS

| | | | |
|---|---|---|---|
| 7,193,538 | B2 | 3/2007 | Craven et al. |
| 7,383,441 | B2 | 6/2008 | Vorbruggen et al. |
| 8,136,139 | B1 | 3/2012 | Habib |
| 8,285,761 | B2 * | 10/2012 | Gupta .................... G06F 16/48 707/825 |
| 9,300,479 | B2 * | 3/2016 | Luo ....................... H04L 9/3273 |
| 2001/0011238 | A1 | 8/2001 | Eberhard et al. |
| 2002/0129255 | A1 | 9/2002 | Tsuchiyama et al. |
| 2004/0021549 | A1 | 2/2004 | Choi et al. |
| 2005/0005146 | A1 * | 1/2005 | Kryeziu .................. G06F 21/10 713/193 |
| 2005/0038756 | A1 | 2/2005 | Nagel |
| 2005/0066172 | A1 | 3/2005 | Vorbruggen et al. |
| 2005/0202804 | A1 | 9/2005 | Silverbrook et al. |
| 2007/0028111 | A1 | 2/2007 | Covely |
| 2008/0168568 | A1 | 7/2008 | Brodersen et al. |
| 2008/0209231 | A1 | 8/2008 | Kim et al. |
| 2008/0240490 | A1 | 10/2008 | Finkelstein et al. |
| 2008/0288977 | A1 | 11/2008 | Howcroft et al. |
| 2010/0185868 | A1 | 7/2010 | Grecia |
| 2011/0058675 | A1 * | 3/2011 | Brueck .............. H04N 21/8355 380/277 |
| 2012/0036365 | A1 | 2/2012 | Kyslov et al. |

FOREIGN PATENT DOCUMENTS

| | | |
|---|---|---|
| JP | 2005-269571 | 9/2005 |
| JP | 2006-033114 | 2/2006 |
| JP | 2006-338102 | 12/2006 |
| JP | 2008-516548 | 5/2008 |
| WO | WO 03/091870 | 11/2003 |
| WO | WO 2011/151678 | 12/2011 |

OTHER PUBLICATIONS

International Preliminary Report on Patentability dated Aug. 18, 2015 in International Patent Application No. PCT/US2014/016571.
International Search Report and Written Opinion dated Jun. 13, 2014 in International Patent Application No. PCT/US2014/016571.
Office Action dated Jan. 12, 2018 in U.S. Appl. No. 14/181,329.
Office Action dated Feb. 27, 2018 in EP Patent Application No. 14751976.3.
Office Action dated Apr. 14, 2017 in U.S. Appl. No. 14/181,329.
Office Action dated Aug. 22, 2016 in JP Patent Application No. 2015-558165.
Office Action dated Sep. 16, 2016 in U.S. Appl. No. 14/181,329.
Summons to Attend Oral Proceedings dated Feb. 12, 2019 in EP Patent Application No. 14751976.3, pp. 1-12.

* cited by examiner

SYSTEMS, METHODS, AND MEDIA FOR RESTRICTING PLAYBACK FUNCTIONALITY OF A MEDIA DEVICE IN RESPONSE TO DETECTING UNAUTHORIZED CONTENT

CROSS REFERENCE TO RELATED APPLICATION

This application is a continuation of U.S. patent application Ser. No. 14/181,329, filed Feb. 14, 2014, which claims the benefit of U.S. Provisional Patent Application No. 61/764,731, filed Feb. 14, 2013, each of which is hereby incorporated by reference herein in its entirety.

BACKGROUND

When a consumer buys a recording on a physical medium, such as a vinyl record or a compact disc from a record store, the consumer can generally be confident that the recording is recorded at a quality advertised on the media, excluding scratches and other physical defects. Audiophiles have been able to buy vinyl records and other physical recording media that promise to provide a higher fidelity sound than less expensive versions of the recording. With non-physical media, however, it can be difficult, if not impossible to know whether the non-physical media's content is actually higher quality or if, instead, the content was merely made to appear to be higher quality when in fact the content is of lower quality than the content appears. Such appearances can be controlled through metadata associated with the content that can include, for example, the sampling rate and the frequency response of the recording.

For example, a lower quality recording can be made to appear to be a higher quality recording by up-sampling a lower quality recording to a higher sampling rate. For instance, a song that is originally digitized with a 44.1 kHz sampling rate (e.g., a typical example of a compact disc sampling rate) can be up-sampled using a sampling rate of 96 kHz to make it appear to be of higher quality. However, because the song was originally recorded at 44.1 kHz, the up-sampling does not add more information than was contained in the original song. Therefore, although the metadata of the song may make it appear to be of higher quality by looking at the metadata, the song will actually be of the lower quality corresponding to the 44.1 kHz sampling rate.

As another example, a lower quality recording can be made to appear to be a higher quality recording by editing the metadata associated with the recording to make it appear to be a higher quality recording. For instance, metadata for the sampling rate can be changed from 44.1 kHz to 96 kHz to make it appear that the recording is recorded at 96 kHz to make the recording appear to be of higher quality if a user were to look at the metadata for the recording. Additionally or alternatively, metadata for the frequency response can be altered to make the recording appear to be of higher quality if a user were to look at the metadata for the recording.

There is, therefore, a need in the art for approaches that can reliably indicate the quality of a digital media content to a user.

SUMMARY

Systems, methods, and media for restricting playback functionality of a media device in response to detecting unauthorized content are provided. In accordance with some embodiments, systems for restricting playback functionality of a media device in response to detecting unauthorized content are provided, the systems comprising: memory; and a hardware processor that is coupled to the memory and that is configured to: determine whether a piece of media content on a media device is unauthorized content known to be obtained through an authorized channel; and in response to determining that the piece of media content is unauthorized content: cause the media device to present a warning to a user to remove the unauthorized content; and change a setting on the media device by sending instructions to a hardware processor of the media device so that decryption of an authenticity token is inhibited for all media content on the media device, wherein the media content on the media device includes a plurality of pieces of media content.

In some embodiments, methods for restricting playback functionality of a media device in response to detecting unauthorized content are provided, the methods comprising: determining whether a piece of media content on a media device is unauthorized content known to be obtained through an authorized channel using a hardware processor; and in response to determining that the piece of media content is unauthorized content, using the hardware processor to: cause the media device to present a warning to a user to remove the unauthorized content; and change a setting on the media device by sending instructions to a hardware processor of the media device so that decryption of an authenticity token is inhibited for all media content on the media device, wherein the media content on the media device includes a plurality of pieces of media content.

In some embodiments, non-transitory computer-readable media containing computer executable instructions that, when executed by a processor, cause the processor to perform a method for restricting playback functionality of a media device in response to detecting unauthorized content are provided, the method comprising: determining whether a piece of media content on a media device is unauthorized content known to be obtained through an authorized channel; and in response to determining that the piece of media content is unauthorized content: causing the media device to present a warning to a user to remove the unauthorized content; and changing a setting on the media device by sending instructions to a hardware processor of the media device so that decryption of an authenticity token is inhibited for all media content on the media device, wherein the media content on the media device includes a plurality of pieces of media content.

DETAILED DESCRIPTION

Figure 1A:
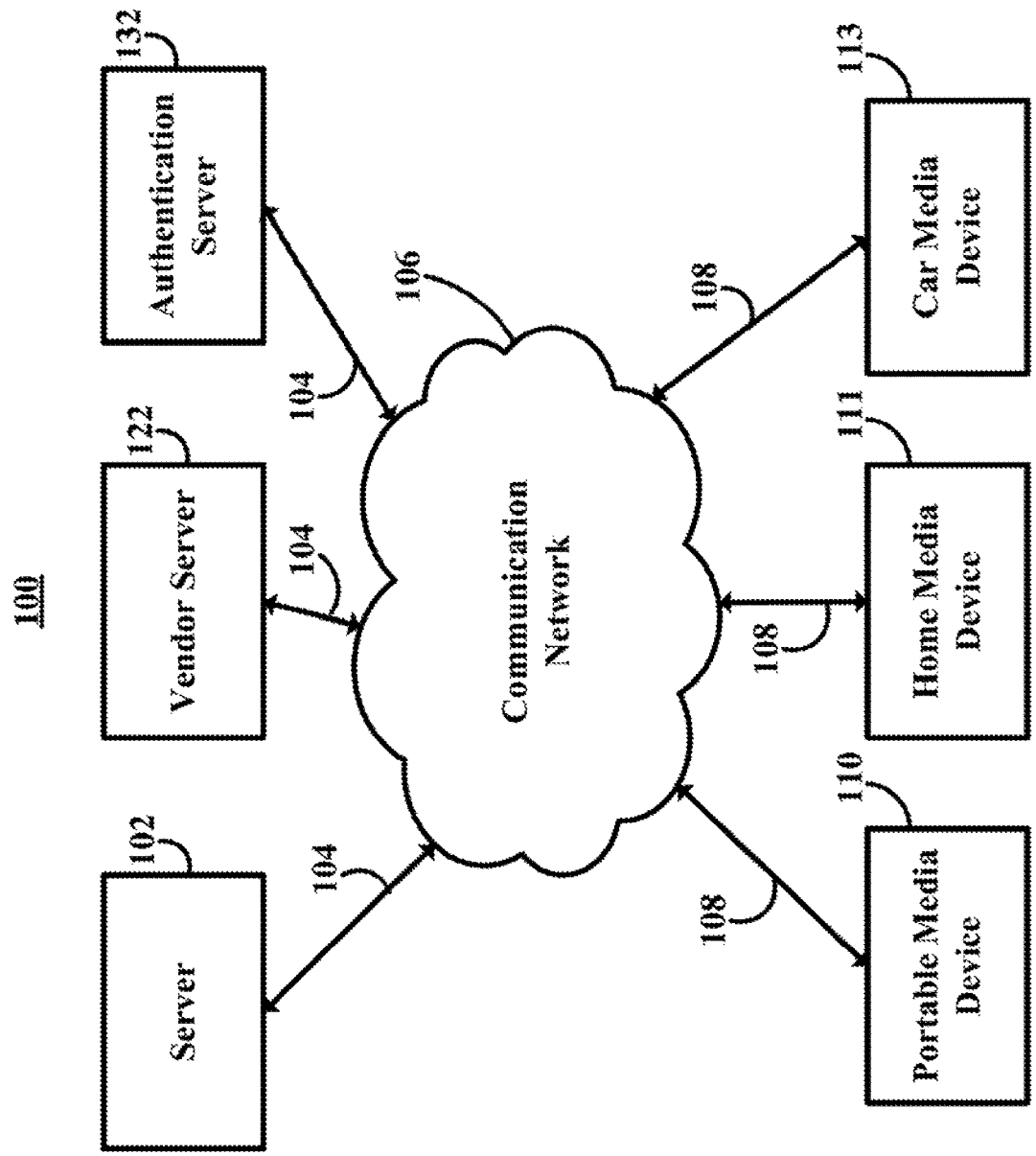
FIG. 1A is an example of a generalized schematic diagram of a system in which the mechanisms for indicating digital media content quality to a user described herein can be implemented in accordance with some embodiments.

In accordance with various embodiments, mechanisms for restricting playback functionality of a media device in response to detecting unauthorized content are provided. In some embodiments, the mechanisms are configured to: determine whether a piece of media content on a media device is unauthorized content known to be obtained through an authorized channel; and in response to determining that the piece of media content is unauthorized content: cause the media device to present a warning to a user to remove the unauthorized content; and change a setting on the media device by sending instructions to a hardware processor of the media device so that decryption of an authenticity token is inhibited for all media content on the media device, wherein the media content on the media device includes a plurality of pieces of media content.

Generally speaking, these mechanisms can provide a user (e.g., a person listening to digital audio) the ability to reliably know the quality of digital media content. This can be accomplished by displaying an authenticity token (or some indicator that such an authenticity token has been received or is otherwise present) to the user during playback of the digital media content. In some embodiments, the authenticity token can be in the form of a flag that causes a light on a device to light up indicating that the currently playing media content is authenticated to be of a certain quality. For example, a car radio can have a light or other indicator that indicates that the currently playing digital audio has an authenticated sampling rate and frequency response above a threshold level. This can indicate that the digital audio is at least a certain authenticated quality.

In some embodiments, these mechanisms can be used with any suitable media content. For example, in some embodiments, the media content can be an audio file, streaming audio, a video file (that includes moving images and/or audio), streaming video (that includes moving images and/or audio), an image file, etc.

In some embodiments, the authenticity token can be in the form of a logo displayed on a display associated in some way with a device playing digital media content that has been authenticated to be a certain quality. For example, a home audio system (e.g., a receiver) associated with a display (e.g., an embedded display, a monitor, a television, a tablet computer, etc.) can cause a logo to be displayed on the display when an audio file that is currently being played is of a certain authenticated quality. In such an embodiment, the logo can be a trademarked logo (such as a trademarked seal of approval) that can indicate that the audio file being played meets certain standards for quality from the source associated with an entity that owns or is associated with the trademark (e.g., a company, a non-profit group, etc.).

In some embodiments, the authenticity token can be in the form of a signature or logo of an artist that recorded the media content and/or a producer that produced the media content. This signature can be displayed on a display associated in some way with a device playing digital media content that has been authenticated to be of a certain quality. For example, a portable audio device with an associated display (e.g., a portable music player, a tablet computer, a mobile phone, a smartphone, etc.) can cause a signature to be displayed on the display when an audio file that is currently being played has an associated authenticity token.

In some embodiments, an artist that performed media content and/or a producer that produced media content can "sign off" (e.g., indicate that the quality of the recording meets with their approval) on the media content of a certain quality as being of the quality at which they intended the media content to be presented. For example, artists often make a so-called "master recording" from which other recordings are to be made for distribution. With digital audio files, the version that is sold and distributed over a network is often intentionally made to be of a lower quality than the master recording because lower quality files typically are smaller and can be transferred over a network more quickly. Using the mechanisms described herein, an artist can certify that a copy of a song made from the master recording at a certain quality is a version that meets the artist's approval as being a high quality digital version of the song. Such a version is referred to herein as a "master quality recording" or an "authenticated song". Additionally or alternatively, such a certification can indicate that a copy of the song is a highest quality of the song available, regardless of whether the quality is a higher quality than other digital sound recordings (e.g., because of limitations in the original recording, because the master recording is lost or otherwise no longer available, etc.).

In some embodiments, authenticated media content can be a digital version of media content that meets certain quality benchmarks and has been certified by the artist, producer, or any other suitable person to present the way that they intended it to be presented. For example, the sampling frequency for a song can be required to be above a certain threshold that a discerning listener considers high enough to not compromise the integrity of the recording. More particularly, for example, the sampling frequency can be required to be at least 96 kHz, 192 kHz, or any other suitable sampling frequency. As another example, the frequency response associated the digital version of the song can be required to be above a certain threshold that a discerning listener considers high enough to not compromise the integrity of the recording. More particularly, for example, the frequency response can be required to be at least 24 kHz.

In some embodiments, a single entity can gather digital media content that have been certified by the artists to be a master quality recording. This entity can be referred to as a licensing entity. The licensing entity can associate an authenticity token with each of the master quality recordings and when a copy of the master quality recording is transmitted to a device, the authenticity token can be transmitted to the device with the master quality recording, or separately.

In some embodiments, a group of entities can develop standards for determining the quality that a recording should meet to be considered a master quality recording, and how to ensure that the quality measures (e.g., sampling rate, frequency response, and any other quality measures) reflect the actual quality of the media content, through, for example, certification by the artist, etc.

In some embodiments, when a user purchases a master quality recording, the user can choose whether to store the copy on a user device. For example, a Web site or a dedicated application can be used by a user to manage which master quality recordings that the user has purchased are copied to which devices owned by the user.

In some embodiments, a user can register each device with the licensing entity and media content can be made available for copying to devices that have been registered. For example, a user can use a device ID associated with the user's devices to register the device with the licensing entity. The licensing entity can then allow the user to manage the master quality recordings associated with each device.

In some embodiments, when a device is registered, a public key-private key pair can be associated with the device and the private key can be stored in the device as software, hardware, firmware, or any combination thereof.

In some embodiments, the licensing entity can certify certain devices as being capable of reproducing digital media content files with sufficient quality to be able to accurately reproduce a master quality recording. For example, to be a certified device, an audio device can be required to have digital audio converters that are capable of converting sound represented in a digital media content file to an audio signal with a signal to noise ratio over a threshold.

In some embodiments, the licensing entity can provide certification at multiple levels of the media content presentation experience, including certifying one or more qualities of a digital media content file, certifying one or more qualities of channels for delivery of digital media content files, and certifying one or more qualities of devices for playing digital media content files.

For example, as described herein, the licensing entity can associate an authenticity token with a particular digital media content file that conveys to a user that the file is a master quality recording. This can indicate that the licensing entity has evaluated the file and determined that the metadata associated with the media content accurately reflects the content of the file (e.g., that a song has not been up-sampled to make it appear to be of a higher quality).

As another example, the licensing entity can certify distribution channels such as retailers (e.g., APPLE ITUNES, AMAZON), digital locker services (e.g., APPLE ICLOUD, AMAZON CLOUD DRIVE, GOOGLE DRIVE, etc.), and media streaming services (e.g., SPOTIFY, PANDORA, etc.), or any other suitable media delivery platform, that are certified as meeting standards set by the licensing body for marketing, selling, and/or distributing media files certified as master quality recordings.

As yet another example, as described herein, the licensing entity can certify certain devices as being certified devices for playing master quality recordings. In addition to having a certain level of hardware to enable high quality playback, these devices can have certain security features that can allow the licensing entity to verify that the device and the recordings on the device are authorized. In some embodiments, these security features can include known digital rights management techniques as well as the security techniques described herein.

In some embodiments, if an unauthorized device and/or unauthorized software is used to illicitly play back authenticated media content, display of the authenticity token can be inhibited. For example, this can inhibit a user that is using an unauthorized device from knowing whether the media content being played has been authenticated, by inhibiting display of the authenticity token. As another example, this can inhibit a user that is using unauthorized software from knowing whether the media content being played has been authenticated, by inhibiting display of the authenticity token.

Figure 1B:
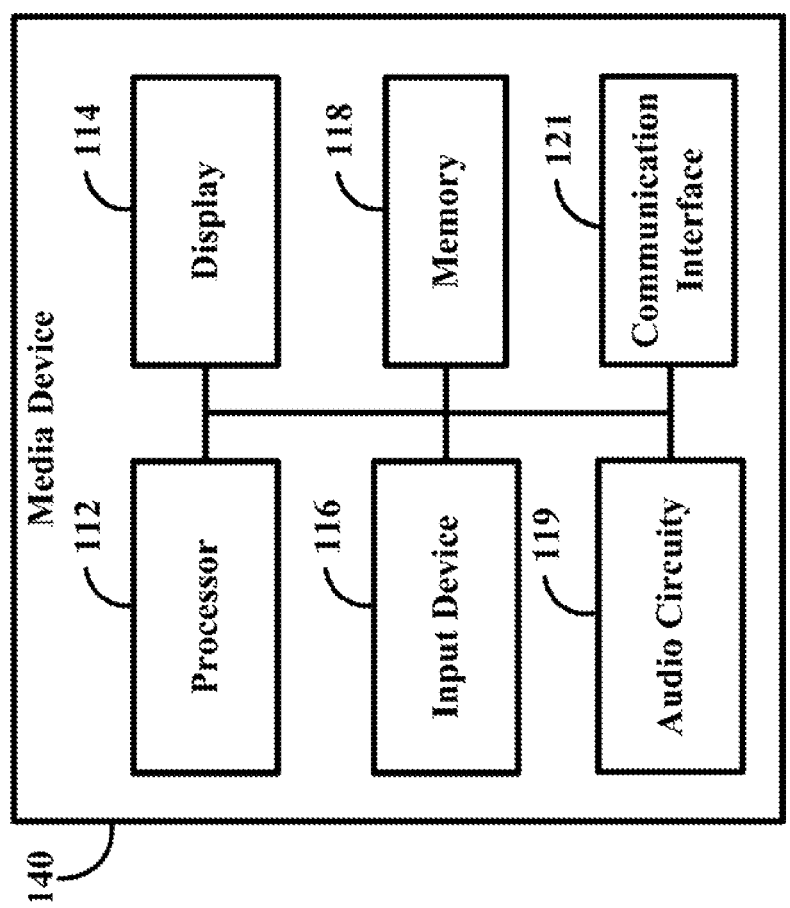
FIG. 1B is an example of hardware that can be used to implement one or more of the media devices depicted in FIG. 1A in accordance with some embodiments.
Figure 1C:
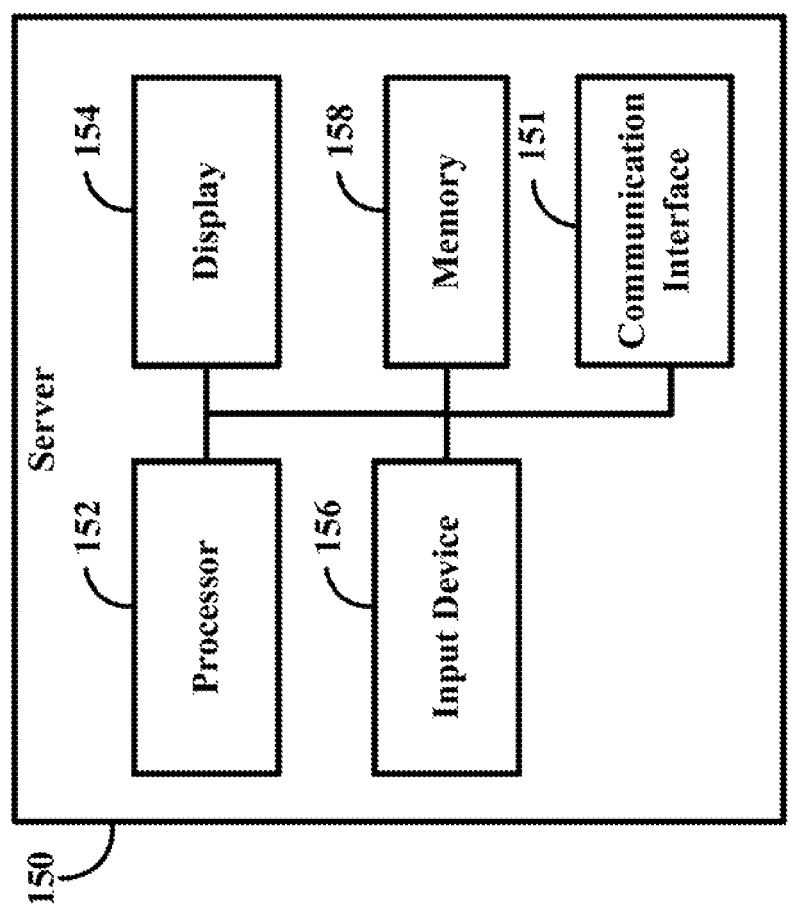
FIG. 1C is an example of hardware that can be used to implement one or more of the servers depicted in FIG. 1A in accordance with some embodiments.

Turning to FIGS. 1A, 1B, and 1C, examples of hardware that can be used in accordance with some embodiments are shown.

More particularly, FIG. 1A shows an example 100 of a generalized schematic diagram of a system on which the mechanisms for indicating digital media content quality to a user described herein can be implemented in accordance with some embodiments. As illustrated, system 100 can include one or more media content devices 110, 111 and 113, one or more servers 102, 122, and 132, a communication network 106, communication links 104 and 108, and/or any other suitable component(s).

Media devices 110, 111 and 113 can be any suitable device(s) or combination of devices for presenting media content, indicating digital media content quality to a user, and/or any other suitable function, in accordance with some embodiments. For example, each of the media devices 110, 111 and 113 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, audio circuitry, etc. For example, media devices 110, 111 and 113 can be implemented as a receiver, a home entertainment system, a personal computer, a laptop computer, a car audio system, a car infotainment system, a multimedia terminal, a smartphone, a tablet computer, a personal data assistant (PDA), a special purpose device, a game console, a streaming media player, a media player, a television, a monitor, etc.

In some embodiments, media devices 110, 111 and 113 can be located in any suitable location, which can be local to each other or remote from each other, and connected to each other using any suitable communication mechanism (not shown).

In accordance with some embodiments, server(s) 102 can be any suitable device(s) or combination of devices for encrypting and/or transmitting content to media devices, transmitting authenticity tokens and metadata to media devices, performing any suitable function described herein, and/or for performing any other suitable function.

In accordance with some embodiments, vendor server(s) 122 can be any suitable device(s) or combination of devices for operating as a digital storefront that acts as an intermediary between a media device 110, 111 or 113 and a server 102, and/or any other suitable function. For example, a vendor server 122 can complete a monetary transaction with a media device 110, 111 or 113 and then transmit a request to a server 102 to deliver content to the media device and/or a request to update a database of a server 102 to associate purchased media content with the device. In some embodiments, vendor server 122 can transmit authorized media content to a media device in response to completion of a monetary or other transaction. In some embodiments, vendor server(s) can be operated by, for example, a content retailer such as APPLE ITUNES, AMAZON, etc.

In some embodiments, authentication server(s) 132 can be any suitable device(s) or combination of devices for verifying that a device is a certified device, that a vendor or other channel for distribution of authenticated media content is authorized, that media content is authenticated media content, and/or any other suitable function. In some embodiments, authentication server 132 can coordinate the activity of vendor servers 122 and/or server 102 to allow for the operation of the mechanisms described herein.

Servers 102, 122, and 132 can be implemented in any suitable manner in some embodiments. For example, any of servers 102, 122, and 132 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc.

Media devices 110, 111 and/or 113 can be connected by one or more communications links 108 to a communications network 106 that can be linked via a communications link 104 to server(s) 102, 122, and/or 132. Communications network 106 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a telephone network, a cable television network, a satellite network, etc. Communications links 104 and 108 can be any communications links suitable for communicating data between media devices 110, 111 and/or 113 and servers 102, 122 and/or 132, such as network links, dial-up links, wireless links, hard-wired links, any other suitable communications links, or any suitable combination of such links.

FIG. 1B illustrates an example 140 of hardware that can be used to implement one or more of media devices 110, 111 and/or 113 depicted in FIG. 1A in accordance with some embodiments. As shown, media device 140 can include a hardware processor 112, a display 114, an input device 116, memory 118, audio circuitry 119, and a communication interface 121, which can be interconnected in any suitable manner, such as using a bus.

Hardware processor 112 can be any suitable device(s) or combination of devices for controlling the operation of media device 140, such as a microprocessor, digital signal processor, a controller, etc., in some embodiments. In some embodiments, hardware processor 112 can execute a computer program, computer instructions, a process, etc. to perform functions described herein.

Display 114 can be any suitable device(s) or combination of devices for generating a visual output, such as a light, an LED, an LED display, an LCD display, a TFT display, a plasma display, a computer monitor, a television, driver circuitry for any of these devices, etc., in some embodiments. In some embodiments, display 114 can be integrated with other components of device 140 or can be separate from these components.

Input device 116 can be any suitable device(s) or combination of devices for receiving input from a user, such as a computer keyboard, a cursor-controller, dial, switch bank, lever, touchscreen, or any other suitable input device, in some embodiments.

Memory 118 can be any suitable device(s) or combination of devices for storing data, computer program(s), instructions, media content, encryption keys, tokens, etc., such as RAM, ROM, flash media, a hard disk, an optical disk, etc., in some embodiments.

Audio circuitry 119 can be any suitable device(s) or combination of devices for generating an audio output to a user. For example, in some embodiments, audio circuitry 119 can include one or more digital signal processors, one or more digital to analog converters, one or more amplifiers, one or more filters, one or more power supplies, one or more speakers, and/or and any other suitable components.

Communication interface 121 can be any suitable device(s) or combination of device for communicating (e.g., transmitting and/or receiving) data, programs, instructions, media content, encryption keys, tokens, etc., in some embodiments. Communication interface 121 can include any suitable transmitter and/or receiver and can be used to implement a wired or wireless interface. For example, interface 121 can be used to implement an Ethernet interface, a WiFi interface, a Bluetooth interface, a cable television interface, a telephone network interface, a mobile data interface (e.g., 3G, 4G, etc.), a satellite interface, etc.

In some embodiments, hardware processor 112, display 114, input device 116, memory 118, audio circuitry 119, and communication interface 121 of media device 140 can interact in any suitable manner to perform any suitable function. For example, in some embodiments, hardware processor 112 can present on display 114 an interface that allows a user to interact with the mechanisms described herein for authenticating and playing content and to send and receive data through communication link 108 via communication interface 121. Data received through communications link 108 or any other communications links can be received from any suitable source in some embodiments.

FIG. 1C illustrates an example 150 of hardware that can be used to implement one or more of servers 102, 122 and/or 132 depicted in FIG. 1A in accordance with some embodiments. As shown, server 150 can include a hardware processor 152, a display 154, an input device 156, memory 158, and a communication interface 151, which can be interconnected in any suitable manner, such as using a bus.

Hardware processor 152 can be any suitable device(s) or combination of devices for controlling the operation of server 150, such as a microprocessor, digital signal processor, a controller, etc., in some embodiments. In some embodiments, hardware processor 152 can execute a computer program, computer instructions, a process, etc. to perform functions described herein.

Display 154 can be any suitable device(s) or combination of devices for generating a visual output, such as a light, an LED, an LED display, an LCD display, a TFT display, a plasma display, a computer monitor, a television, driver circuitry for any of these devices, etc., in some embodiments. In some embodiments, display 154 can be integrated with other components of server 150 or can be separate from these components.

Input device 156 can be any suitable device(s) or combination of devices for receiving input from a user, such as a computer keyboard, a cursor-controller, dial, switch bank, lever, touchscreen, or any other suitable input device, in some embodiments.

Memory 158 can be any suitable device(s) or combination of devices for storing data, computer program(s), instructions, media content, encryption keys, tokens, etc., such as RAM, ROM, flash, a hard disk, an optical disk, etc., in some embodiments.

Communication interface 151 can be any suitable device(s) or combination of device for communicating (e.g., transmitting and/or receiving) data, programs, instructions, encryption keys, tokes, etc., in some embodiments. Communication interface 151 can include any suitable transmitter and/or receiver and can be used to implement a wired or wireless interface. For example, interface 151 can be used to implement an Ethernet interface, a WiFi interface, a Bluetooth interface, a cable television interface, a telephone network interface, a mobile data interface (e.g., 3G, 4G, etc.), a satellite interface, etc.

In some embodiments, server 102, vendor server 122, and/or authentication server 132 can be implemented in one server or can be distributed as any suitable number of servers. For example, multiple servers 102 can be implemented in various locations to increase reliability and/or increase the speed at which the server can communicate with media devices.

Figure 2:
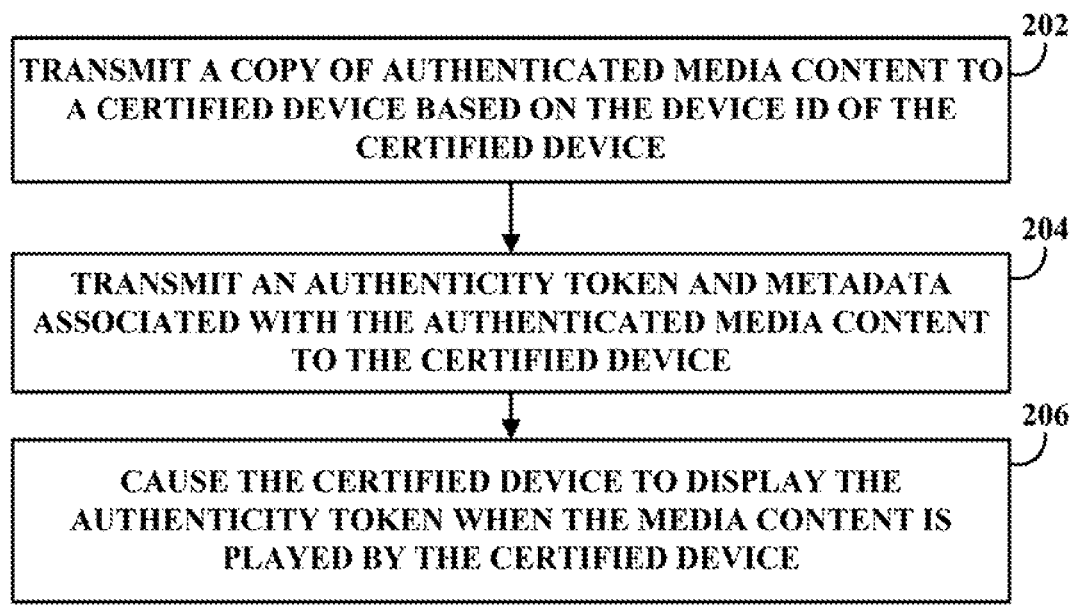
FIG. 2 is an example of a process for distributing authenticated media content to a certified device and causing a display of an authenticity token at the certified device in accordance with some embodiments.

FIG. 2 shows an example 200 of a process for distributing authenticated media content to a certified device and causing a display of an authenticity token at the certified device for use with an end-to-end system for high quality digital media content distribution and playback in accordance with some embodiments. Process 200 can include transmitting a copy of authenticated media content to a certified device based on a device ID of the certified device at 202, transmitting an authenticity token and metadata associated with the authenticated media content to the certified device at 204, and causing the certified device to display the authenticity token when the authenticated media content is played by the certified device at 206.

In some embodiments, process 200 can be performed using any suitable hardware and/or software. For example, some or all of process 200 can be performed using the hardware illustrated in FIGS. 1A, 1B, and 1C. More particularly, for example, portions of process 200 can be performed by a hardware processor of a media device or server described in connection with in FIGS. 1A, 1B, and/or 1C in accordance with a computer program and/or instructions stored in a memory of the media device or server.

At 202, a copy of authenticated media content can be transmitted from a content provider (e.g., the licensing entity, or another entity certified as a content provider by the licensing entity) server 102 (using a hardware processor and communication interface of the server) to a hardware processor of a certified device based on a device identification (device ID) of the certified device. In some embodiments, before transmitting a copy of media content, the device ID of the device requesting media content can be checked by the hardware processor of server 102 against a list of certified devices that have been registered with a provider of the mechanisms described herein. If the device ID corresponds to a certified and registered device, the media content can be transmitted to the device. If the device ID does not correspond to a registered device, transmitting of the media content to the device can be inhibited. In some embodiments, the authenticated media content can be encrypted by the hardware processor of server 102 such that it will not be playable on a device that does not have a correct digital key for decryption. Additionally, the media content can be encrypted by the hardware processor of server 102 before transmission such that a specific encryption key associated with the certified device that requested the media content is required to decrypt the authorized media content. Alternatively, in some embodiments, the media content can be transmitted in an unencrypted form.

In some embodiments, the authenticated media content can be transmitted by the hardware processor of server 102 in response to receiving an indication from a hardware processor of a vendor server 122 that a user purchased the media content from a content vendor (e.g., AMAZON, APPLE ITUNES, etc.). In some embodiments, the vendor server 122 can act as a storefront that completes the monetary transaction of selling the media content to a user, but the media content can be transferred to a user from a server 102 of a content provider or an authentication server 132 of an entity that administers the authentication of media content in accordance with the mechanisms described herein. In some embodiments, certain content vendors can become authorized dealers of media content and can distribute copies of the media content using a server 102 as well as completing the monetary transaction with the user using a vendor server 122.

In some embodiments, the authenticated media content can be transmitted in connection with a service that streams media content to a user. For example, if a user of a device uses a service that streams media content to the user's device without storing the media content in memory for later playback, a hardware processor of a server 102 of the streaming service can stream a copy of the authenticated media to the authenticated device. In another example, a hardware processor of a vendor server 122 of the streaming service can act as an intermediary and request that a hardware processor of a server 102 of the content provider stream the media content to the user device.

In some embodiments, the authenticated media content can be transmitted in response to a user selecting which media to store in memory for later playback on the device from songs that the user has already purchased. For example, a record can be kept in a memory of a vendor server 122 of which media content a user of a particular certified device has purchased and a copy of purchased media content can be transmitted by a hardware processor of the vendor server 122 to a hardware processor the certified device (e.g., device 110, 111, or 113) in response to the user selecting that media content to be put on the device.

At 204, an authenticity token and metadata associated with the authenticated media content can be transmitted to the authenticated device. In some embodiments, the authenticity token and the metadata can be transmitted together with the authenticated media content by a hardware processor and communication interface of a server 102. Alternatively, the authenticity token and the metadata can be transmitted separately from the authenticated media content—e.g., by the authenticity token and the metadata being transmitted by a hardware processor and a communication interface of an authentication server 132 and the authenticated media content being transmitted by a hardware processor and a communication interface of a server 102. As described below, the authenticity token and the metadata can be encrypted by a hardware processor of server 102 or 132 to make the authenticity token and metadata inaccessible to unauthorized devices.

At 206, a hardware processor of a certified device (e.g., device 110, 111, or 113) can display, or cause to be displayed, the authenticity token when the authenticated media content is played back using the certified device. For example, a hardware processor and a display of a certified device can be configured to display cover art (e.g., an image that is associated with the media content, such as an image of the artist, or an image selected by the artist or producer to associate with the media content), and the authenticity token can be displayed along with the cover art. As another example, a hardware processor of a device can be configured to turn on an LED when media content associated with an authenticity token is being played to indicate the presence of the authenticity token. As yet another example, a hardware processor of a certified device can display the authenticity token on a display associated with the certified device. Any suitable program and/or instructions can be used by the hardware processor to display, or cause to be displayed, the authenticity token. For example, the authenticated media content, the metadata, and/or the authenticity token can contain instructions that cause the token to be displayed.

Figure 3:
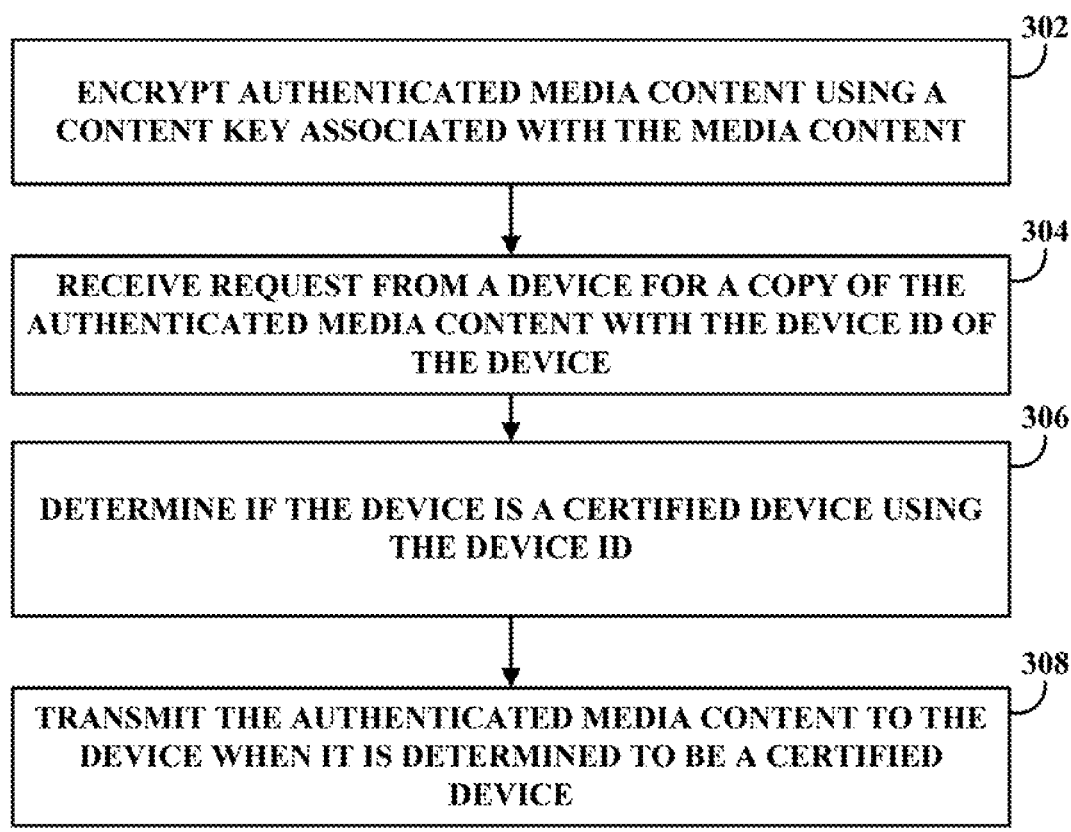
FIG. 3 is an example of a process for transmitting authenticated media content to a certified device with an associated device ID in accordance with some embodiments.

FIG. 3 shows an example 300 of a process for transmitting authenticated media content to a certified device with an associated device ID in accordance with some embodiments. Process 300 can include encrypting one or more pieces of authenticated media content using a content key associated with the particular media content at 302, receiving a request from a device for a copy of the authenticated media content along with a device ID associated with the device making the request at 304, determining if the device is a certified device using the device ID at 306, and transmitting the authenticated media content to the device when it is determined to be a certified device at 308.

In some embodiments, process 300 can be performed using any suitable hardware and/or software. For example, some or all of process 300 can be performed using the hardware illustrated in FIGS. 1A, 1B, and 1C. More particularly, for example, portions of process 300 can be performed by a hardware processor of a media device or server described in connection with in FIGS. 1A, 1B, and/or 1C in accordance with a computer program and/or instructions stored in a memory of the media device or server.

At 302, authenticated media content can be encrypted by a hardware processor of a server 102 of the content provider using a key particular to the content of the authenticated media content, which can be referred to as a content key. In some embodiments, a separate key can be used for each different piece of media content available from the content provider. For example, each piece of media content can have a content key generated using a pseudo-random function with part of the media content used as an input. As another example, a content key can be assigned to each piece of media content from a list of keys generated using any suitable technique. Additionally, the content key can be changed periodically by the hardware processor of server 102 to inhibit the content key from being discovered and used without the permission and/or knowledge of the licensing entity. For example, the content keys can be changed periodically and a user can be required to periodically synchronize the content on the user's device to the content encrypted with the content key. As another example, the content key can have a timing parameter associated with it and the content encrypted by the content key can be corrupted or otherwise rendered unusable when the content key timing parameter expires.

In some embodiments, the encryption of the media content need not be performed and thus the encryption at step 302 can be omitted from process 300.

At 304, a request for a copy of a particular piece of authenticated media content can be received at a hardware processor of a server 102 from a hardware processor of a device (e.g., a device 110, 111, or 113) along with the device ID (which can be encrypted in some embodiments) associated with the requesting device. In some embodiments, the request can be received from a mechanism for managing media content stored on a device—e.g., which can be implemented by a hardware processor of a vendor server 122 or a device 110, 111, or 113. Additionally or alternatively, the request can be part of a transaction for the user buying the media content from a retailer which can be implemented by a hardware processor of a vendor server 122. Additionally or alternatively, the request can be received from a hardware processor of a vendor server 122 of a media content streaming service that streams the requested media content to the device.

In some embodiments, the request can be received at a hardware processor of content server 102 operated by a content provider. For example, a provider of the mechanisms described herein can operate a content server 102 that can receive requests for authenticated media content from devices with an associated device ID.

At 306, whether the device is a certified device can be determined by a hardware processor of a server 102 or 132 by checking the device ID (after unencrypting it, if needed) received at 304 against a list (or a database, etc.) of device IDs of certified devices. At 306, if the device ID associated with the request is not in the list of device IDs or if there is no device ID associated with the request, the request can be ignored by the hardware processor of the server 102 or 132 or an error message can be returned by the hardware processor of the server 102 or 132. Otherwise, if the device ID matches a device ID of a certified and/or registered device, the authenticated media content (which can be encrypted as described in connection with step 304) can be transmitted to the device over a network at 308 by a hardware processor of server 102 in response to determining that the device ID matches a device ID of a certified and/or registered device by the hardware processor of server 102 or in response to a request to transmit the media content from a hardware processor of a server 132.

Figure 4A:
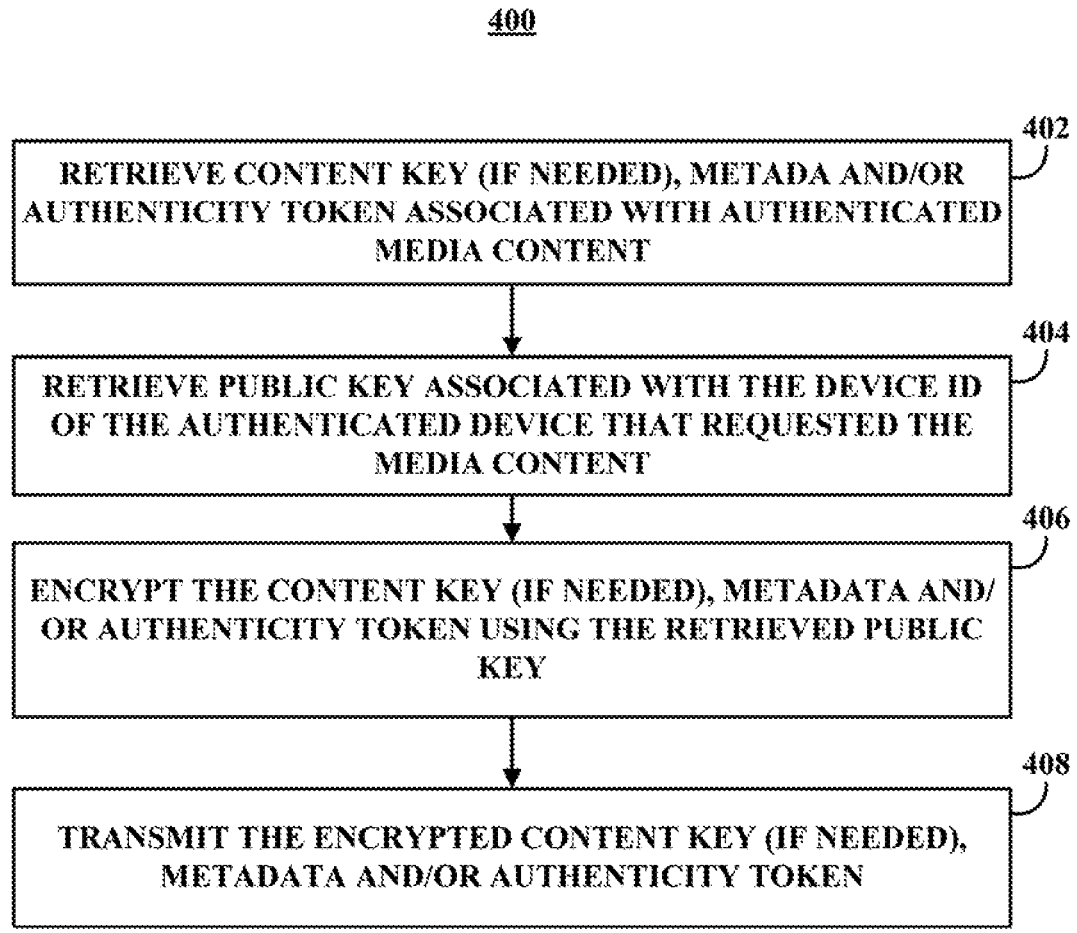
FIG. 4A is an example of a process for transmitting metadata about media content, a content key for decrypting media content, and/or an authenticity token in accordance with some embodiments.

FIG. 4A shows an example 400 of a process for transmitting metadata about media content, a content key for decrypting media content, and/or an authenticity token in accordance with some embodiments.

In some embodiments, process 400 can be performed using any suitable hardware and/or software. For example, some or all of process 400 can be performed using the hardware illustrated in FIGS. 1A, 1B, and 1C. More particularly, for example, portions of process 400 can be performed by a hardware processor of a media device or server described in connection with in FIGS. 1A, 1B, and/or 1C in accordance with a computer program and/or instructions stored in a memory of the media device or server.

At 402, a content key used to encrypt media content that was requested and is to be delivered using the processes described in association with FIG. 3 can be retrieved by a hardware processor of a server 102 or 132. In some embodiments, the content key can be stored in a database of a server 102 or 132 in association with the media content the content key is used to encrypt. Alternatively, the content key can be kept in a separate database and can be identified as being associated with that media content. As described above, in some embodiments, the media content need not be encrypted and thus retrieval of the content key can be omitted from process 400.

At 402, metadata and an authenticity token associated with the media content requested in process 300 can also be retrieved by a hardware processor of a server 102 or 132.

At 404, a public key associated with a device ID of a device requesting media content in process 300 can be retrieved from a database by a hardware processor of a server 102 or 132. In some embodiments, each device ID can be associated with a unique public key. This can increase the security of the system and prevent unauthorized use by devices that have not been properly certified by requiring the devices to have a private key that matches the public key associated with the device ID being used. In some embodiments, the public key retrieved at 404 can be associated with more than one device ID (up to and including being associated with all device IDs).

At 406, the content key (if needed), metadata, and/or authenticity token can be encrypted using the public key retrieved at 404 by a hardware processor of a server 102 or 132. In some embodiments, the content key (if needed), metadata, and/or authenticity token can be encrypted after a request for media content has been made such that the data can be encrypted using a public key unique to the device requesting the media content.

At 408, the content key (if needed), metadata, and/or authenticity token (each as encrypted or not as described above) can be transmitted to the device that requested the media content by a hardware processor and a communication interface of a server 102 or 132.

Figure 4B:
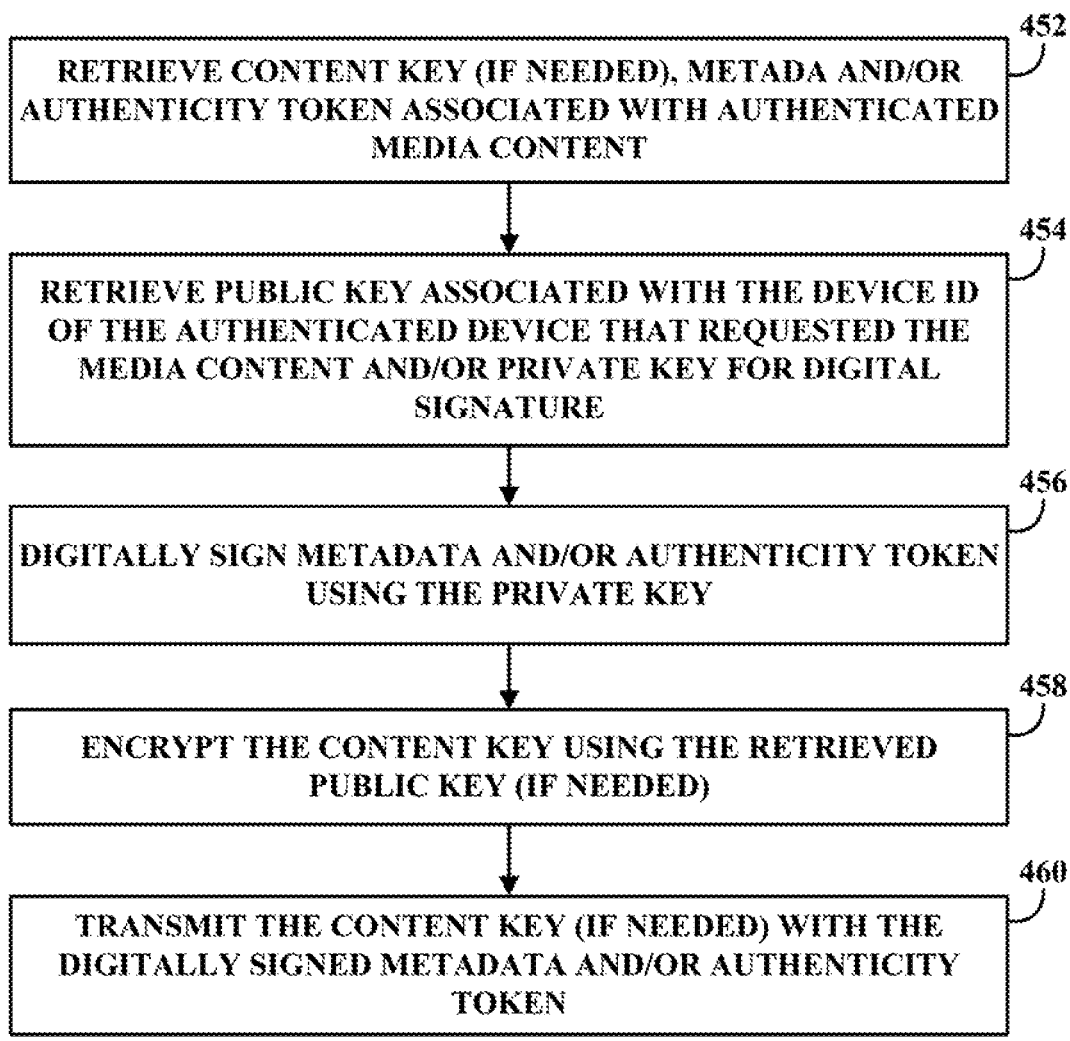
FIG. 4B is another example of a process for transmitting metadata about media content, a content key for decrypting media content, and/or an authenticity token in accordance with some embodiments.

FIG. 4B shows another example 450 of a process for transmitting metadata about media content, a content key for decrypting media content, and/or an authenticity token in accordance with some embodiments.

In some embodiments, process 450 can be performed using any suitable hardware and/or software. For example, some or all of process 450 can be performed using the hardware illustrated in FIGS. 1A, 1B, and 1C. More particularly, for example, portions of process 450 can be performed by a hardware processor of a media device or server describer in connection with in FIGS. 1A, 1B, and/or 1C in accordance with a computer program and/or instructions stored in a memory of the media device or server.

Process 450 of FIG. 4B is similar to process 400 of FIG. 4A. For example, at 452, a content key used to encrypt media content that was requested and is to be delivered using the processes described in association with FIG. 3 can be retrieved by a hardware processor of a server 102 or 132, similarly to 402, if needed based on the media content being encrypted or not. At 454, if the media content is encrypted, a public key associated with a device ID of a device requesting media content in process 300 can be retrieved from a database by a hardware processor of a server 102 or 132, similarly to 404. However, in process 450, the metadata and/or authenticity token need not be encrypted with the public key associated with the device ID, as is done at 406. Instead, at 456, the metadata and/or authenticity token can be digitally signed by a hardware processor of a server 102 of the content provider using a private key that can be retrieved at 454. If the media content is encrypted, the content key can be encrypted at 458 using the retrieved public key (similarly to the encryption of the content key at 406) by a hardware processor of a server 102. At 460, the content key (if needed), the metadata and/or the authenticity token can be transmitted to the device that requested the media content by a hardware processor and a communication interface of a server 102. This can allow a certified device to verify that the metadata and/or the authenticity token are genuine and have not been tampered with by verifying the digital signature of the content provider.

As described below, the mechanisms described herein can inhibit some techniques used for circumventing security measures. In one example, if a certified device obtains content from an unauthorized source it can be detected because the unauthorized content will not be associated with the certified device in a database maintained by a server. More particularly, if a media device 110 contains a file that was not delivered from server 102 or any other authorized channel, this can be detected because the authorized content on the device can be known to server 102 and the unauthorized content does not match with any content known to be obtained through an authorized channel. In such an example, a hardware processor of a server 102 can change the settings of the media device 110 by sending instructions to a hardware processor of the media device such that decryption/rendering of the authenticity token is inhibited for some and/or all of the content on the device. In some embodiments, a user can by presented with a warning to remove the content that was obtained through an unauthorized channel before the authenticity token is inhibited from displaying by a hardware processor of the media device.

In another example, if a device has been illicitly associated with an otherwise valid device ID (e.g., a counterfeit device), the device may attempt to obtain content from an authorized source of media content. In this case, a memory of a server 102 can have a list of device IDs for registered and certified media devices from manufacturers it has approved to make the devices. In order to obtain content from an authorized source, the counterfeit device may be required to have both a valid device ID and a private key matching that valid ID. If a counterfeit device has both of these pieces of data it may be able to obtain content, but any other device having the same device ID may be prevented by a hardware processor of a server 102 or 132 from being registered. This can inhibit unauthorized users from copying the device ID of an authorized device and using that device ID to register multiple devices. In some embodiments, unregistered devices can be permitted to download authenticated media content, but the authenticity token can be withheld from such devices (e.g., download of an authenticity token associated with the authenticated media content can be inhibited) by a hardware processor of a server 102 or 132. Additionally or alternatively, the authenticity token can be encrypted using a public key/private key pair where the private key is not associated with any registered device by a hardware processor of a server 102 or 132, such that display of the authenticity token is inhibited.

As yet another example, if authorized media content is delivered to a certified and registered device, but then is made available to other devices, the other devices may not be able to play the authorized media content and/or may not be able to verify and/or display the authenticity token because the other device does not have the proper device ID and private key. If the other device is not a certified device, it may not be able to play the media content and/display the authenticity token unless it had access to the proper private key for decrypting the authenticity token and the content key (e.g., unless the other device is a counterfeit device).

Figure 5:
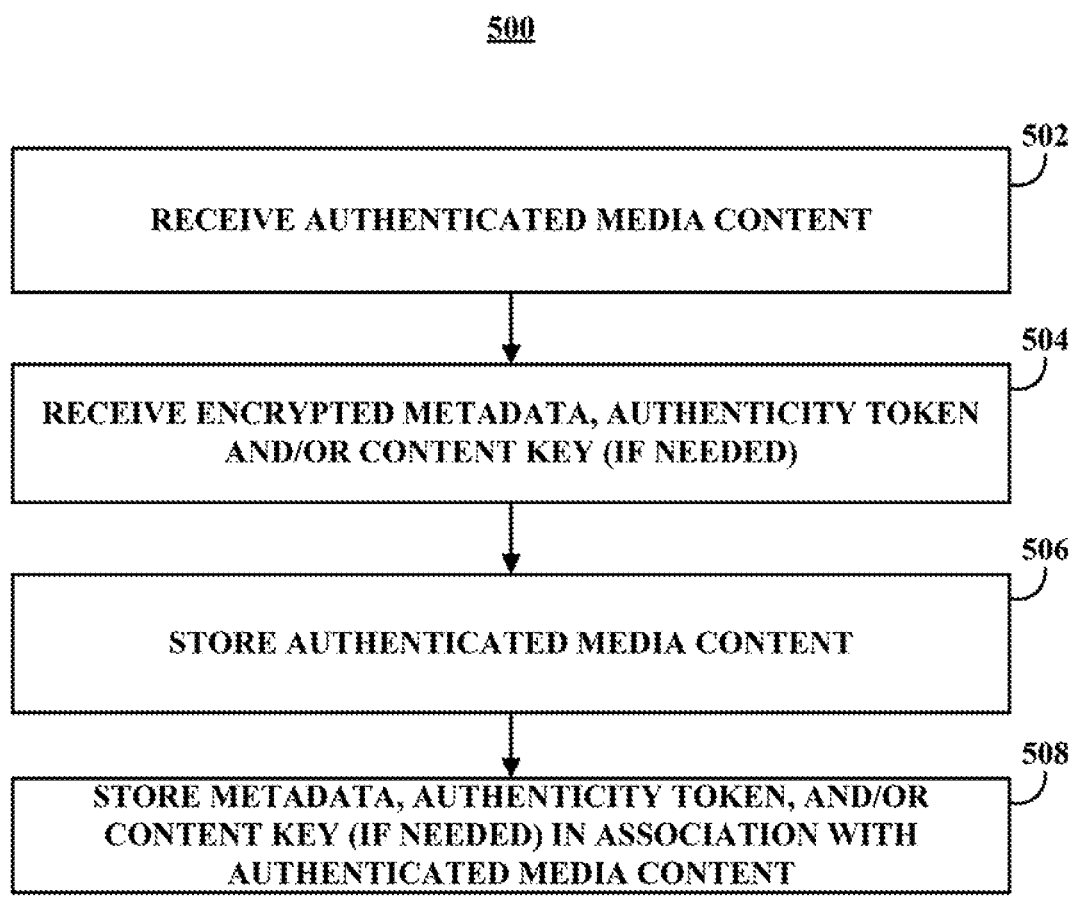
FIG. 5 is an example of a process for receiving authenticated encrypted media content at a certified media device in accordance with some embodiments.

FIG. 5 shows an example 500 of a process for receiving authenticated media content at a certified media device in accordance with some embodiments.

In some embodiments, process 500 can be performed using any suitable hardware and/or software. For example, some or all of process 500 can be performed using the hardware illustrated in FIGS. 1A, 1B, and 1C. More particularly, for example, portions of process 500 can be performed by a hardware processor of a media device or server described in connection with in FIGS. 1A, 1B, and/or 1C in accordance with a computer program and/or instructions stored in a memory of the media device or server.

As shown in FIG. 5, in some embodiments, a hardware processor of a media device can: receive authenticated media content (which can be encrypted if needed) at 502; receive encrypted metadata, an encrypted authenticity token, and/or an encrypted content key (if needed due to the media content being encrypted) at 504; store the authenticated media content at 506; and store the metadata, authenticity token, and/or content key (if needed due to the media content being encrypted) in association with the authenticated media content at 508.

In some embodiments, as described above, the authenticated media content can be encrypted using a content key particular to the content of the authenticated media content.

Additionally, the content key (if needed), metadata, and authenticity token can be encrypted using a public key that corresponds to the private key associated with the media device that receives the media content at 502.

In some embodiments, the authenticated media content, metadata, authenticity token, and/or content key (if needed) can be stored in an encrypted or decrypted state in a memory of a device 110, 111, or 113 or a server 102. Storing some of the data in an encrypted state and decrypting the data when an instruction is received to play the authenticated media content can contribute to the authenticated media content being stored more securely.

Figure 6:
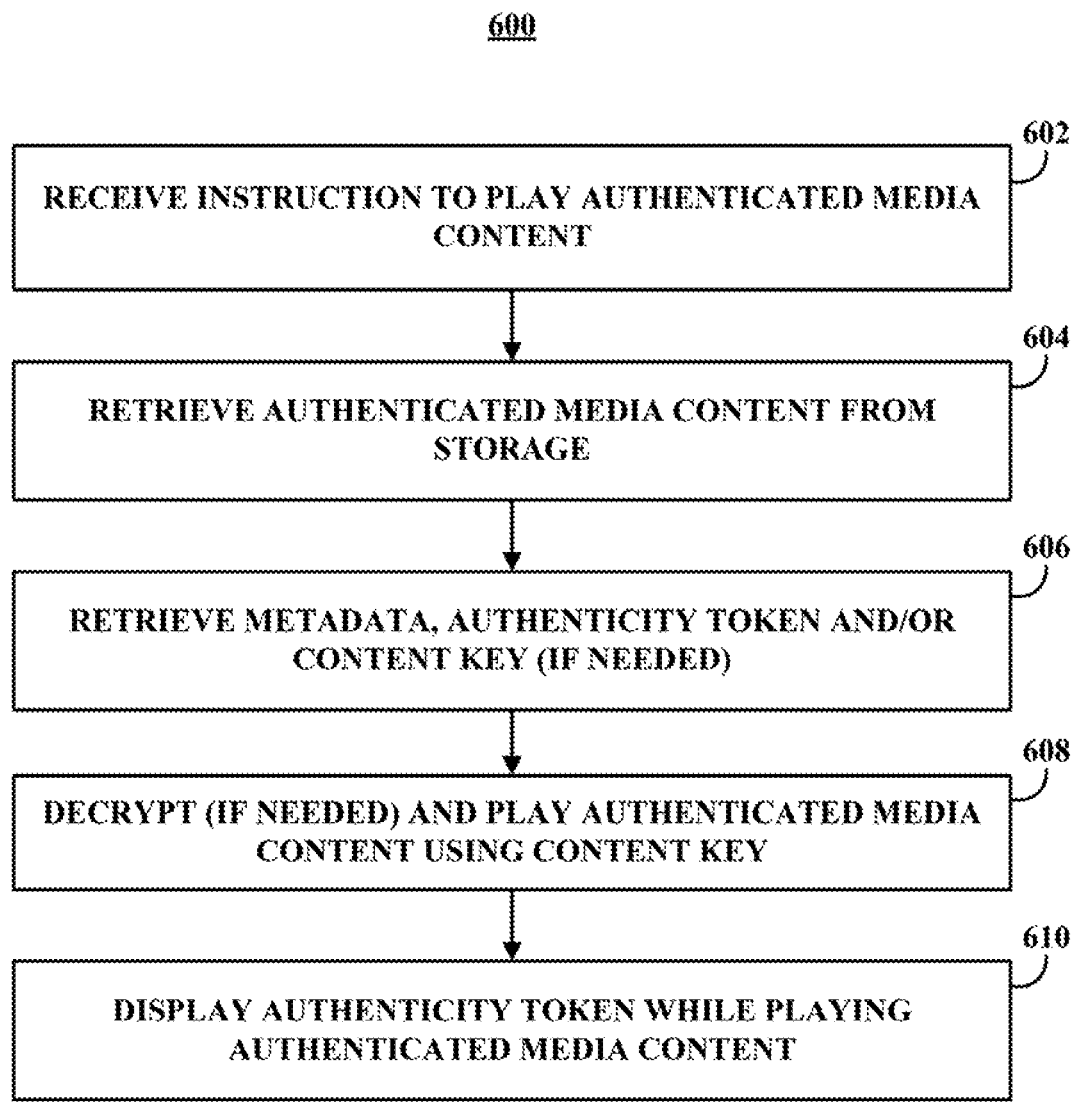
FIG. 6 is an example of a process for playing authenticated media using a certified media content device and displaying an indication to a user that the authenticated media content being played meets certain sound quality standards in accordance with some embodiments.

FIG. 6 shows an example 600 of a process for playing authenticated media content using a certified media device and displaying an indication to a user that the authenticated media content being played meets certain quality standards as described herein in accordance with some embodiments.

In some embodiments, process 600 can be performed using any suitable hardware and/or software. For example, some or all of process 600 can be performed using the hardware illustrated in FIGS. 1A, 1B, and 1C. More particularly, for example, portions of process 600 can be performed by a hardware processor of a media device or server described in connection with in FIGS. 1A, 1B, and/or 1C in accordance with a computer program and/or instructions stored in a memory of the media device or server.

As shown in FIG. 6, in some embodiments, a hardware processor of a certified media device can: receive an instruction to play authenticated media content at 602; retrieve the authenticated media content from storage (e.g., memory) at 604; retrieve the metadata, authenticity token, and/or content key (if needed) associated with the authenticated media content at 606; decrypt the authenticated media content using the content key (which can be decrypted using, for example, a private key) (if needed) and play the media content at 608; and display the authenticity token while playing the authenticated media content at 610.

In one example of the mechanisms described herein, a user can purchase a certified media device 110 (e.g., a receiver) and register the device with a hardware processor of server 102 (or authentication server 132 in some embodiments) to obtain a private key (which can be generated by the hardware processor and transmitted to the device by the hardware processor and a corresponding communication interface). The user can purchase one or more pieces of authenticated media content using a hardware processor of a vendor server 122 (e.g., the user can access a vendor Web site and purchase songs). The user can log-in to an account that the user created when he/she registered media device 110 and request that a hardware processor of a server 102 transmit copies of the media content purchased from the vendor. A hardware processor and a communication interface of a server 102 can transmit a copy of the authenticated media content (which can be encrypted) along with associated metadata, an authenticity token, and/or a content key (if needed) in accordance with the mechanisms described herein.

After the authenticated media content are received at a hardware processor of media device 110, the hardware processor of media device 110 can play one of the pieces of authenticated media content. The hardware processor of the media device 110 can retrieve the authenticated media content and the metadata, authenticity token, and/or content key. The hardware processor of the media device 110 can use the private key received when it was registered to decrypt the metadata, authenticity token and/or content key if needed. The content key can be used to decrypt the authenticated media content if needed, and the authenticated media content can be played using media device 110 by the hardware processor of the media device. While the authenticated media content is playing, the authenticity token can be displayed by the hardware processor of the media device on a display associated with the media device (e.g., an embedded display) in order to demonstrate to the user that the authenticated media content is of the promised quality.

Figure 7:
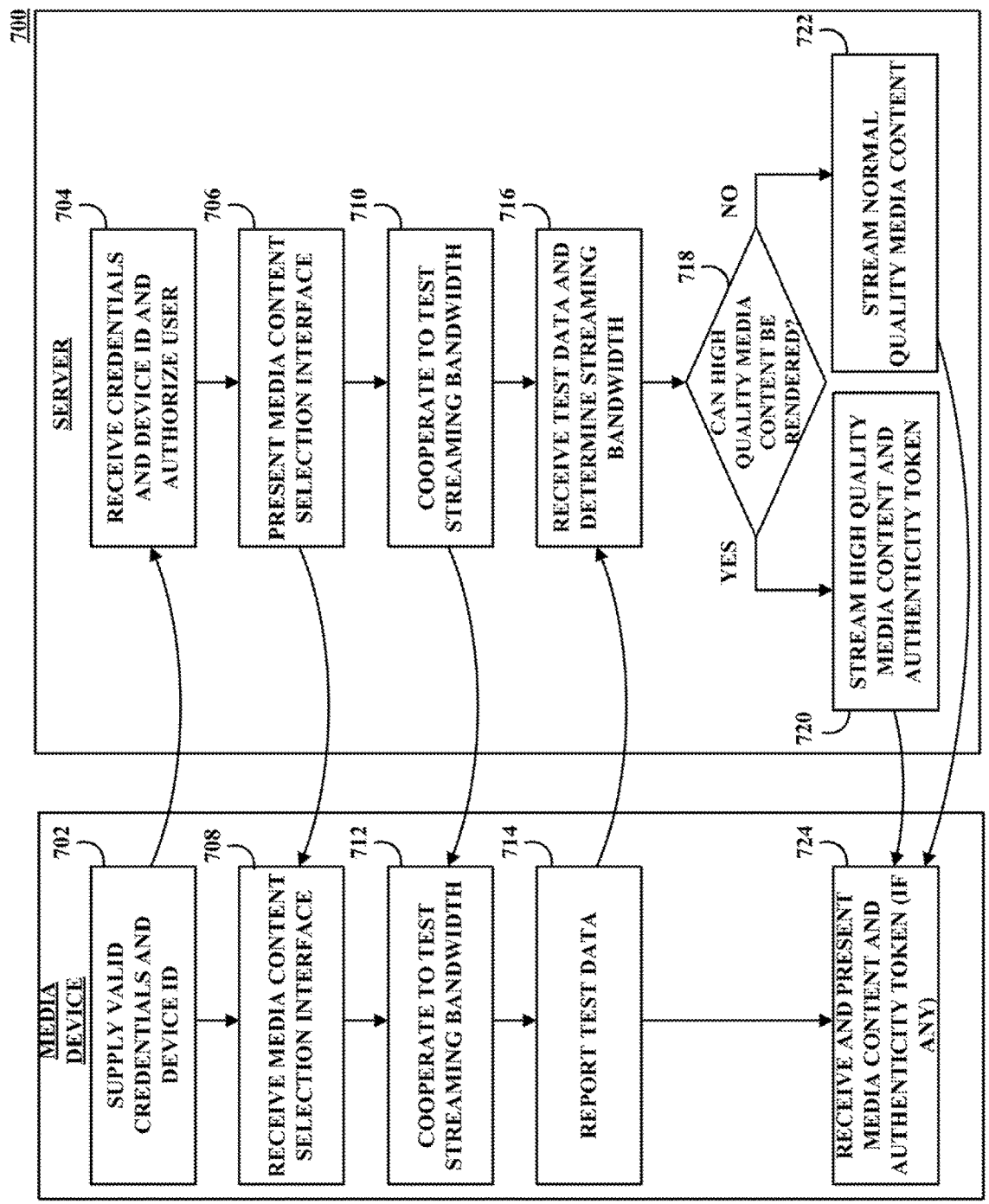
FIG. 7 is an example of a process for playing authenticated media content using streaming in accordance with some embodiments.

FIG. 7 shows an example 700 of a process for playing authenticated media content using streaming in accordance with some embodiments.

In some embodiments, process 700 can be performed using any suitable hardware and/or software. For example, some or all of process 700 can be performed using the hardware illustrated in FIGS. 1A, 1B, and 1C. More particularly, for example, portions of process 700 can be performed by a hardware processor of a media device and a hardware processor of a server described in connection with in FIGS. 1A, 1B, and/or 1C in accordance with a computer program and/or instructions stored in a memory of the media device or server.

As shown in FIG. 7, after process 700 begins, a hardware processor of a media device (e.g., media device 110) can send valid user credentials and a device ID of the media device to a hardware processor of a server (e.g., server 102) via the communication interfaces of the media device and the server at 702. Any suitable user credentials can be used (e.g., a user name and a password) and these credentials can be obtained from any suitable source (e.g., a user, memory of the media device, etc.). At 704, the credentials and device ID can be received, and the user authorized at 704, by the hardware processor of the server.

Next, the hardware processor of the server can cause a media content selection interface to be presented to the user at 706 and the hardware processor of the media device can cause the media content selection interface to be presented at 708. These can be performed in any suitable manner. For example, in some embodiments, the hardware processor of the server can send a Web page to the hardware processor of the media device at 706, and the hardware processor of the media device can receive the Web page and present it via a coupled display at 708.

At 710 and 712, the hardware processors of the media device and the server can cooperate to test the streaming bandwidth between the server (or another server) and the media device. This can be performed in any suitable manner.

Once the test is complete, at 714, the hardware processor of the media device can report any test data to the hardware processor of the server, and, at 716, the hardware processor of the server can receive the test data (if any) and determine the streaming bandwidth.

Next, at 718, the hardware processor of the server can determine whether media content of a quality corresponding to an authentication token ("high quality" media content) can be rendered by the media device. This determination can be made in any suitable manner. For example, in some embodiments, this determination can be made based on the credentials of the user, the device ID, characteristics of the media device (e.g., whether it is registered, compromised, counterfeit, etc.), the streaming bandwidth to the media device, the availability of high quality media content, and/or any other suitable criteria or criterion.

If it is determined at 718 that high quality media content can be rendered by the media device, then at 720, the hardware processor of the server can stream high quality media content (which can have been selected using the content selection interface, and which can be encrypted if needed) along with an authenticity token (which can be encrypted and/or digitally signed as described above if needed) to the media device. Otherwise, at 722, the hardware processor of the server can stream normal quality media content (which can have been selected using the content selection interface, and which can be encrypted if needed) to the media device.

At 724, the streamed media content and the authenticity token (if any) can be received and presented.

Accordingly, methods, systems, and media for indicating digital media content quality to a user are provided.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for indicating that digital media content playback using a media device is representative of a master quality recording and restricting playback functionality of the media device in response to detecting unauthorized content, comprising:
   memory; and
   a hardware processor that is coupled to the memory and that is configured to:
     receive from the media device a request for a first piece of media content having a quality of a master quality recording;
     receive a device identification associated with the media device;
     send to the media device an authenticity token that is associated with the first piece of media content and that indicates that audio circuitry in the media device is capable of playing audio of the first piece of media content with sufficient quality to be able to accurately reproduce a master quality recording, wherein the authenticity token is configured to be visibly displayed to the user by the media device in a manner that indicates that playback of the first piece of media content by the audio circuitry in the media device is of a quality that is representative of a master quality recording, wherein the authenticity token being associated with the first piece of media content indicates that metadata regarding the quality of the first piece of media content accurately reflects the actual quality of the first piece of media content;
     determine whether a second piece of media content on the media device is unauthorized content known to be obtained through an authorized channel; and
     in response to determining that the second piece of media content is unauthorized content:
       cause the media device to present a warning to a user to remove the unauthorized content; and
       change a setting on the media device by sending instructions to a hardware processor of the media device so that decryption of an authenticity token for each piece of media content on the media device is inhibited.

2. The system of claim 1, wherein changing the setting on the media device is performed in response to the user not removing the unauthorized content.

3. The system of claim 1, wherein the hardware processor is configured to determine whether the second piece of media content is unauthorized content by determining that the second piece of media content is not listed as being associated with the media device in a database.

4. The system of claim 1, wherein the hardware processor is configured to determine whether the second piece of media content is unauthorized content by determining that the second piece of media content is not listed as being associated with the media device in a database, wherein the media device is certified as being able to render media content at a quality of a master recording.

5. The system of claim 4, wherein the hardware processor is further configured to determine whether the media device is certified by unencrypting a device identifier and checking a database.

6. A method for indicating that digital media content playback using a media device is representative of a master quality recording and restricting playback functionality of the media device in response to detecting unauthorized content, comprising:
   receiving, at a hardware processor from the media device, a request for a first piece of media content having a quality of a master quality recording;
   receiving a device identification associated with the media device;
   sending to the media device an authenticity token that is associated with the first piece of media content and that indicates that audio circuitry in the media device is capable of playing audio of the first piece of media content with sufficient quality to be able to accurately reproduce a master quality recording, wherein the authenticity token is configured to be visibly displayed to the user by the media device in a manner that indicates that playback of the first piece of media content by the audio circuitry in the media device is of a quality that is representative of a master quality recording, wherein the authenticity token being associated with the first piece of media content indicates that metadata regarding the quality of the first piece of media content accurately reflects the actual quality of the first piece of media content;
   determining whether a second piece of media content on the media device is unauthorized content known to be obtained through an authorized channel using the hardware processor; and in response to determining that the second piece of media content is unauthorized content, using the hardware processor to:
cause the media device to present a warning to a user to remove the unauthorized content; and
change a setting on the media device by sending instructions to a hardware processor of the media device so that decryption of an authenticity token for each piece of media content on the media device is inhibited.

7. The method of claim 6, wherein changing the setting on the media device is performed in response to the user not removing the unauthorized content.

8. The method of claim 6, wherein the hardware processor determines whether the second piece of media content is unauthorized content by determining that the second piece of media content is not listed as being associated with the media device in a database.

9. The method of claim 6, wherein the hardware processor determines whether the second piece of media content is unauthorized content by determining that the second piece of media content is not listed as being associated with the media device in a database, wherein the media device is certified as being able to render media content at a quality of a master recording.

10. The method of claim 9, further comprising using the hardware processor to determine whether the media device is certified by unencrypting a device identifier and checking a database.

11. A non-transitory computer-readable medium containing computer executable instructions that, when executed by a processor, cause the processor to perform a method for indicating that digital media content playback using a media device is representative of a master quality recording and restricting playback functionality of the media device in response to detecting unauthorized content, the method comprising:
receiving, from the media device, a request for a first piece of media content having a quality of a master quality recording;
receiving a device identification associated with the media device;
sending to the media device an authenticity token that is associated with the first piece of media content and that indicates that audio circuitry in the media device is capable of playing audio of the first piece of media content with sufficient quality to be able to accurately reproduce a master quality recording, wherein the authenticity token is configured to be visibly displayed to the user by the media device in a manner that indicates that playback of the first piece of media content by the audio circuitry in the media device is of a quality that is representative of a master quality recording, wherein the authenticity token being associated with the first piece of media content indicates that metadata regarding the quality of the first piece of media content accurately reflects the actual quality of the first piece of media content;
determining whether a second piece of media content on the media device is unauthorized content known to be obtained through an authorized channel; and
in response to determining that the second piece of media content is unauthorized content:
causing the media device to present a warning to a user to remove the unauthorized content; and
changing a setting on the media device by sending instructions to a hardware processor of the media device so that decryption of an authenticity token for each piece of media content on the media device is inhibited.

12. The non-transitory computer-readable medium of claim 11, wherein changing the setting on the media device is performed in response to the user not removing the unauthorized content.

13. The non-transitory computer-readable medium of claim 11, wherein the hardware processor determines whether the second piece of media content is unauthorized content by determining that the second piece of media content is not listed as being associated with the media device in a database.

14. The non-transitory computer-readable medium of claim 11, wherein the hardware processor determines whether the second piece of media content is unauthorized content by determining that the second piece of media content is not listed as being associated with the media device in a database, wherein the media device is certified as being able to render media content at a quality of a master recording.

15. The non-transitory computer-readable medium of claim 14, wherein the method further comprises using the hardware processor to determine whether the media device is certified by unencrypting a device identifier and checking a database.

* * * * *